United States Patent
Gagnon et al.

[11] Patent Number: 5,865,463
[45] Date of Patent: Feb. 2, 1999

[54] AIRBAG DEPLOYMENT CONTROLLER

[75] Inventors: Scott Darrell Gagnon, Plant City; Said Shafik Nakhla, Lakeland; James Woodhouse Griggs, III, Bradenton; Clinton Boyd, Orlando, all of Fla.

[73] Assignee: Breed Automotive Technology, Inc., Lakeland, Fla.

[21] Appl. No.: 831,238

[22] Filed: Apr. 2, 1997

Related U.S. Application Data

[63] Continuation-in-part of Ser. No. 801,928, Feb. 15, 1997, Pat. No. 5,810,392.

[51] Int. Cl.⁶ .................................................. B60R 21/26
[52] U.S. Cl. ......................................... 280/735; 280/730.2
[58] Field of Search ................................ 280/735, 730.2

[56] References Cited

U.S. PATENT DOCUMENTS

| | | | |
|---|---|---|---|
| 4,361,741 | 11/1982 | Leskoverc et al. | 200/85 |
| 4,509,614 | 4/1985 | Bando et al. | 180/273 |
| 4,607,199 | 8/1986 | Krueger et al. | 318/484 |
| 4,633,237 | 12/1986 | Tuchnott et al. | 340/573 |
| 4,655,313 | 4/1987 | Hicks | 180/273 |
| 4,678,058 | 7/1987 | Wooters | 180/273 |
| 4,806,713 | 2/1989 | Krug et al. | 200/85 |
| 5,109,945 | 5/1992 | Koga | 180/273 |
| 5,120,980 | 6/1992 | Fontaine | 307/16.1 |
| 5,161,820 | 11/1992 | Vollmer | 280/730 |
| 5,164,709 | 11/1992 | Lamberty et al. | 340/667 |
| 5,232,243 | 8/1993 | Blackburn et al. | 280/732 |
| 5,398,185 | 3/1995 | Omura | 280/735 |
| 5,413,378 | 5/1995 | Steffens, Jr. et al. | 280/735 |
| 5,439,249 | 8/1995 | Steffens, Jr. et al. | 280/735 |
| 5,454,591 | 10/1995 | Mazur et al. | 280/735 |
| 5,466,001 | 11/1995 | Gotomyo et al. | 280/730.1 |
| 5,474,327 | 12/1995 | Schousek | 280/735 |
| 5,481,078 | 1/1996 | Asche | 200/85 |
| 5,494,311 | 2/1996 | Blackburn et al. | 280/735 |
| 5,573,269 | 11/1996 | Gentry et al. | 280/735 |
| 5,612,876 | 3/1997 | Zeidler et al. | 364/424 |
| 5,739,757 | 4/1998 | Gioutsos | 280/735 |

FOREIGN PATENT DOCUMENTS

0728636  8/1996  European Pat. Off. .

*Primary Examiner*—Kenneth R. Rice
*Attorney, Agent, or Firm*—Lonnie Drayer

[57] ABSTRACT

An airbag deployment controller has a plurality of sensors interposed between a rigid member and a seat pan member such that the weight supported by a portion of the seat cushion which the rigid member underlies is transferred from the rigid member to the seat pan via said sensors. The sensors sense the magnitude of the force transferred therethrough. A device processes signals from the sensors to determine the weight that the portion of the seat cushion which the rigid member underlies is bearing. The signal processing device controls the activation and operation of an airbag as a function of the presence and weight of a seat occupant. Optionally, the tension on a seat belt may also be sensed and processed as a parameter for controlling the deployment of an airbag.

22 Claims, 11 Drawing Sheets

AIRBAG DEPLOYMENT CONTROLLER

This is a Continuation-in-Part of application Ser. No. 08/801,928 filed Feb. 15, 1997 now U.S. Pat. No. 5,810,392.

The present invention relates to an apparatus for sensing the presence and weight of an occupant of a vehicle seat and controlling the deployment of an airbag associated with the vehicle seat.

BACKGROUND OF THE INVENTION

Many vehicles are equipped with airbags to protect persons occupying various seats in the vehicle. If a seat is unoccupied or is occupied by a person of a particular size, it may not be necessary to activate the airbag associated with that seat. Furthermore, if a seat is occupied by a person of a particular size, the manner in which a safety device is employed may be varied accordingly. One indicator of the size of a seat occupant is his or her weight. In the case of an infant, the combined weight of the infant and an infant safety seat is useful as an indicator of occupant size.

There is a need in the field of inflatable vehicle occupant restraints, such as airbags, to determine if the occupant of the front passenger seat of a motor vehicle equipped with a front passenger side airbag is an infant in an infant seat or a small child weighing less than a preselected amount Thus, the airbag deployment controller disclosed herein may determine the presence or absence of an object or person on a seat cushion, and the weight of the person or object on a seat cushion and based upon those determinations may allow or disallow the deployment of an airbag.

SUMMARY OF THE INVENTION

There is provided in accordance with one aspect of the invention an airbag deployment controller comprising: (a) a seat force sensing assembly comprising:(i) a seat pan, (ii) a rigid member disposed vertically above said seat pan in a spaced apart vertically juxtaposed relationship with said seat pan, said rigid member underlying a portion of a seat cushion, and (iii) a plurality of sensors interposed between the rigid member and the seat pan such that all of the force transferred from the rigid member to the seat pan is transferred via said sensors which sense the magnitude of the force transferred therethrough and generate signals; and (b) a signal processor which is in circuit communication with said sensors and comprises (i) signal summing circuitry; (ii) comparator circuitry; and (iii) a switch through which an airbag firing signal must pass, with each component of the signal processor being in circuit communication with another component of the signal processor.

There is provided in accordance with another aspect of the invention an airbag deployment controller comprising: (a) a seat force sensing assembly comprising(i) a seat having a seat support member and a seat pan member fastened to one another; (ii) a frame disposed vertically above said seat pan in a spaced apart vertically juxtaposed relationship with said seat pan, said frame underlying a portion of a seat cushion; and (iii) a plurality of sensors interposed between the frame and the seat pan such that all of the force transferred from the frame to the seat pan is transferred via said sensors which sense the magnitude of the force transferred therethrough and send signals to a signal processor; and (b) a signal processor which is in circuit communication with said sensors and processes the signals from the sensors to determine the weight that said portion of the seat cushion is bearing, said signal processor comprising (i) signal summing circuitry; (ii) comparator circuitry; and (iii) a switch through which an airbag firing signal must pass with each component of the signal processor being in circuit communication with another component of the signal processor.

There is provided in accordance with yet another aspect of the invention an airbag deployment controller comprising: (a) a seat force sensing assembly comprising (i) a seat having a seat support member and a seat pan member fastened to one another; (ii) a frame disposed vertically above said seat pan in a spaced apart vertically juxtaposed relationship with said seat pan, said frame underlying a portion of a seat cushion, said portion of the seat cushion being spaced apart from a rear edge of the seat cushion; and (iii) a plurality of sensors interposed between the frame and the seat pan such that all of the force transferred from the frame to the seat pan is transferred via said sensors which sense the magnitude of the force transferred therethrough and send signals to a device which processes said signals to a signal processor; and (b) a signal processor which is in circuit communication with said sensors and processes the signals from the sensors to determine the weight that said portion of the seat cushion is bearing, said signal processor comprising (i) signal summing circuitry; (ii) comparator circuitry; and (iii) a switch through which an airbag firing signal must pass with each component of the signal processor being in circuit communication with another component of the signal processor.

There is provided in accordance with yet another aspect of the invention an airbag deployment controller comprising: (a) a seat force sensing assembly comprising (i) a seat having a seat support member and a seat pan member fastened to one another; (ii) a frame disposed vertically above said seat pan in a spaced apart vertically juxtaposed relationship with said seat pan, said frame underlying a portion of a seat cushion, the frame and the seat pan being at least partially retained in said vertically juxtaposed relationship by a tension member; (iii) a plurality of sensors interposed between the frame and the seat pan such that all of the force transferred from the frame to the seat pan is transferred via said sensors which sense the magnitude of the force transferred therethrough and send signals to a signal processor; and (b) a signal processor which is in circuit communication with said sensors and processes the signals from the sensors to determine the weight that said portion of the seat cushion is bearing, said signal processor comprising (i) signal summing circuitry; (ii) comparator circuitry; and (iii) a switch through which an airbag firing signal must pass with each component of the signal processor being in circuit communication with another component of the signal processor.

There is provided in accordance with yet another aspect of the invention a kit for retrofitting a vehicle seat with an airbag deployment controller comprising a frame having a plurality of sensors mounted thereon in locations which correspond to a vertically uppermost surface of a vehicle seat pan and a signal processor which processes signals from said sensors to determine the weight that is located above and resting upon said frame, said signal processor comprising (a) signal summing circuitry; (b) comparator circuitry; and (c) a switch through which an airbag firing signal must pass with each component of the signal processor being in circuit communication with another component of the signal processor.

DISCUSSION OF THE PRIOR ART

U.S. Pat. No. 5,232,243 and U.S. Pat. No. 5,494,311 teach a seat occupant sensor that is a piezoelectric film which is rigidly mounted to a substantially inflexible bottom portion of the seat. A plurality of sensing elements are arranged in rows and columns forming an array.

U.S. Pat. No. 5,454,591 teaches the use of this sensor to determine if a vehicle seat is occupied by an occupant weighing up to about 18.2 kilograms (40 pounds) or more than about 18.2 kilograms (40 pounds) and send an appropriate signal to a safety device control unit.

U.S. Pat. No. 5,474,327 teaches a seat occupant presence, weight and position sensor system wherein a plurality of sensors are located in the seat base just beneath the seat cover and some pressure is exerted on the sensors by the seat cover. The preferred sensors are mounted between polymer sheets and include a pair of conductive electrodes about 2.54 centimeters (1 inch) in diameter separated by carbon layers such that resistance between electrodes decreases as pressure increases.

U.S. Pat. N0. 5,161,820 teaches a seat occupant sensor which is a switch, preferably a flat mat-like contact switch wherein two contact layers are separated by an intermediate elastically deformable, electrically conductive layer. The contact switch is mechanically activated when the seat occupant compresses the intermediate layer and completes a conductive pathway for the switching circuit. The use of a simple physical contact switch or a condenser-type switch is also disclosed. However, the seat structure incorporating any of these switches is not shown in the drawings or described in the specification. The seat occupant sensor taught in this patent employs sensors located both in the seat and in the floor in front of the seat.

U.S. Pat. No. 4,678,058 teaches a vehicle seat switch assembly including a generally C-shaped spring located underneath the seat cushion. The end portions of the spring are displaced laterally when the spring is depressed when the seat is occupied. The lateral displacement of the spring ends pulls a switch plunger to close the switch.

U.S. Pat. No. 5,413,378 and U.S. Pat. No. 5,439,249 teach the use of an occupant weight sensor located in or on a structure that includes a seat cushion. The exact structure and operation of the occupant weight sensor is not disclosed in either of these patents.

U.S. Pat. No. 5,466,001 teaches the use of sensors embedded in a seat cushion and seat back to sense occupant presence, but the structure of the sensors is not disclosed. U.S. Pat. No. 5,109,945 also teaches the use of a seat switch to detect a seat occupant but does not disclose the structure of the switch or the manner of incorporating the switch into the seat.

U.S. Pat. No. 5,481,078 teaches a set occupant sensor wherein the seat rails pivot about their forward end against leaf springs designed to support the seat weight plus a known fraction of the occupant's weight so that the rear of the seat is raised when the seat is unoccupied. When the seat is occupied, the rear of the seat moves down and an electronic sensor detects seat position to provide a position signal. U.S. Pat. No. 4,655,313, U.S. Pat. No. 4,361,741 and U.S. Pat. No. 4,509,614 also teach a vehicle seat switch used with a seat which pivots relative to the front of the seat cushion.

U.S. Pat. No. 5,120,980 teaches a foam seat cushion confining wire mesh electrical switch closing contacts.

U.S. Pat. No. 5,164,709 teaches a seat occupant sensor which is a lateral-force-sensitive cable laid in a meandering pattern foamed into the seat cushion.

U.S. Pat. No. 4,806,713 teaches a seat-contact switch for generating a "seat occupied" signal when a seat suspension approaches a seat frame as a result of seat loading. An articulatable device is fastened on one end to the seat suspension and on the other end to the seat frame.

U.S. Pat. No. 4,607,199 teaches the use of a seat switch in conjunction with a microprocessor to disable operation of a vehicle if the seat occupant is out of position for a given period of time. The switch structure and manner of incorporating the switch into the seat are not disclosed.

EP 0 728 636 A1 teaches the use of a switch sensor switch disposed in a seat base but does not disclose the switch structure and manner of incorporating the switch into the seat.

U.S. Pat. No. 4,633,237 teaches an occupant sensor for a hospital bed including a plurality of sensors defining interstices of a matrix of such sensors. The matrix is woven into a mat for placement on a bed in which a patient is confined.

U.S. Pat. No. 5,612,876 teaches a seat occupancy sensor having a front sensing region and a rear sensing region which can be evaluated separately. The inhibiting of an airbag release can be provided in the case of an incorrect sitting position.

BRIEF DESCRIPTION OF THE DRAWINGS

The invention may take physical form in certain parts and arrangement of parts, a preferred embodiment of which will be described in detail in this description and illustrated in the accompanying drawings which form a part hereof and wherein.

DETAILED DESCRIPTION OF THE INVENTION

Figure 1:
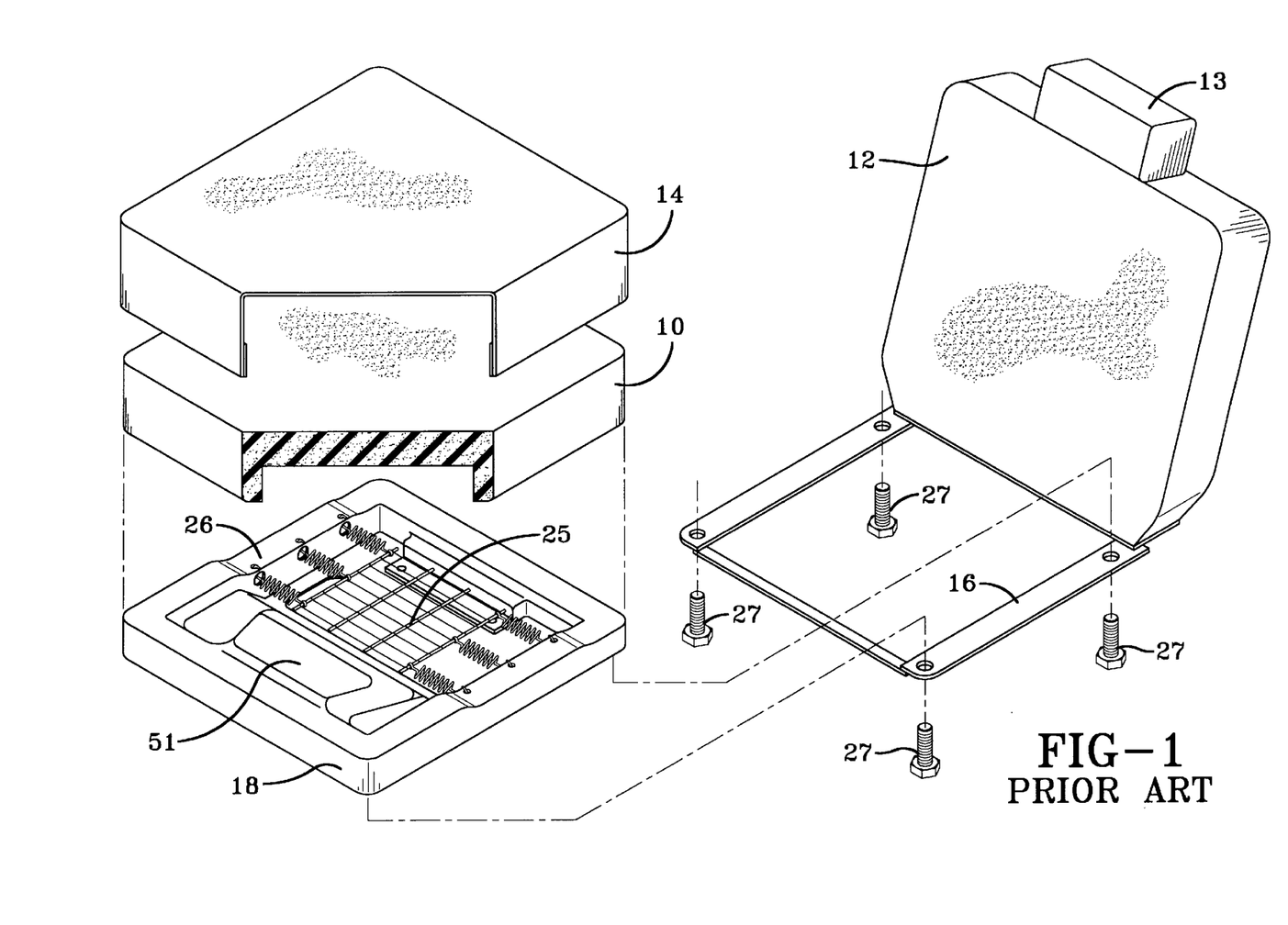
FIG. 1 is an exploded view of a typical prior art vehicle seat.

Referring first to FIG. 1 there is shown an exploded view of a typical prior art vehicle seat. A vehicle seat has a seat cushion 10 and a seat back 12. The seat back may have a head rest 13 associated therewith. The seat back may be pivotally attached to the remainder of the seat. The seat cushion 10 is made of a comfortable, supportive but compressible material, for example foam rubber. The seat has a rigid seat support member 16, sometimes referred to as the seat frame. The rigid seat support member may be unitary, as shown in FIG. 1, with a cross member extending between two side rails, or the side rails may only be joined to one another by the seat back and maintained parallel to one another by fastening the seat frame to legs which extend between seat frame and the floor of the vehicle.

Figure 2:
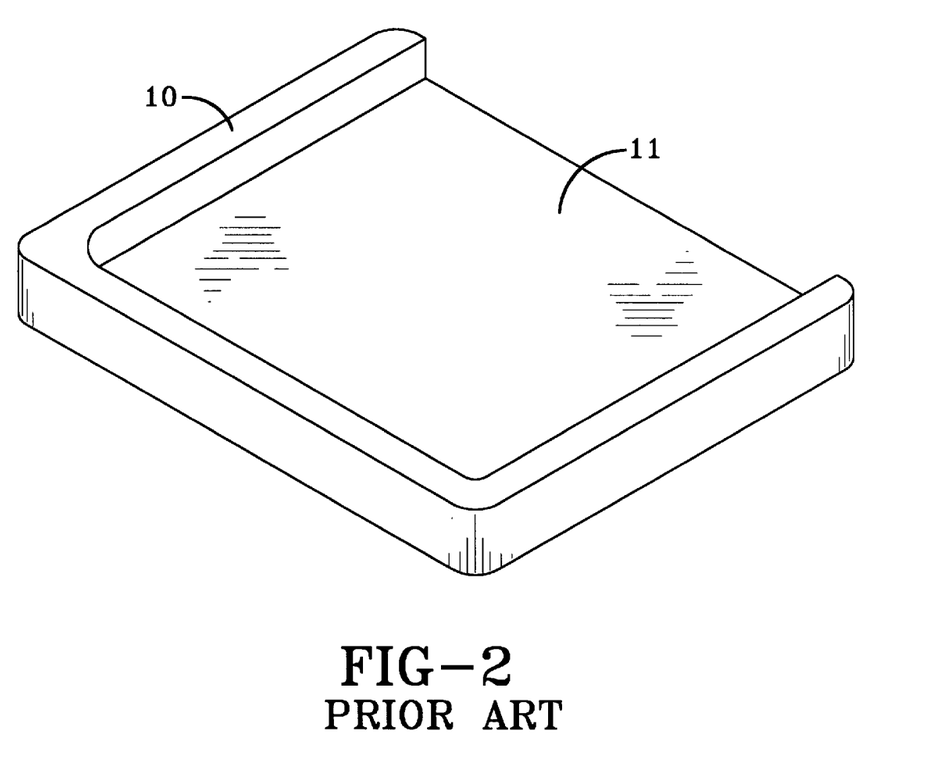
FIG. 2 is a perspective view of the bottom side of a prior art seat cushion used with the prior art seat shown in FIG. 1.
Figure 3:
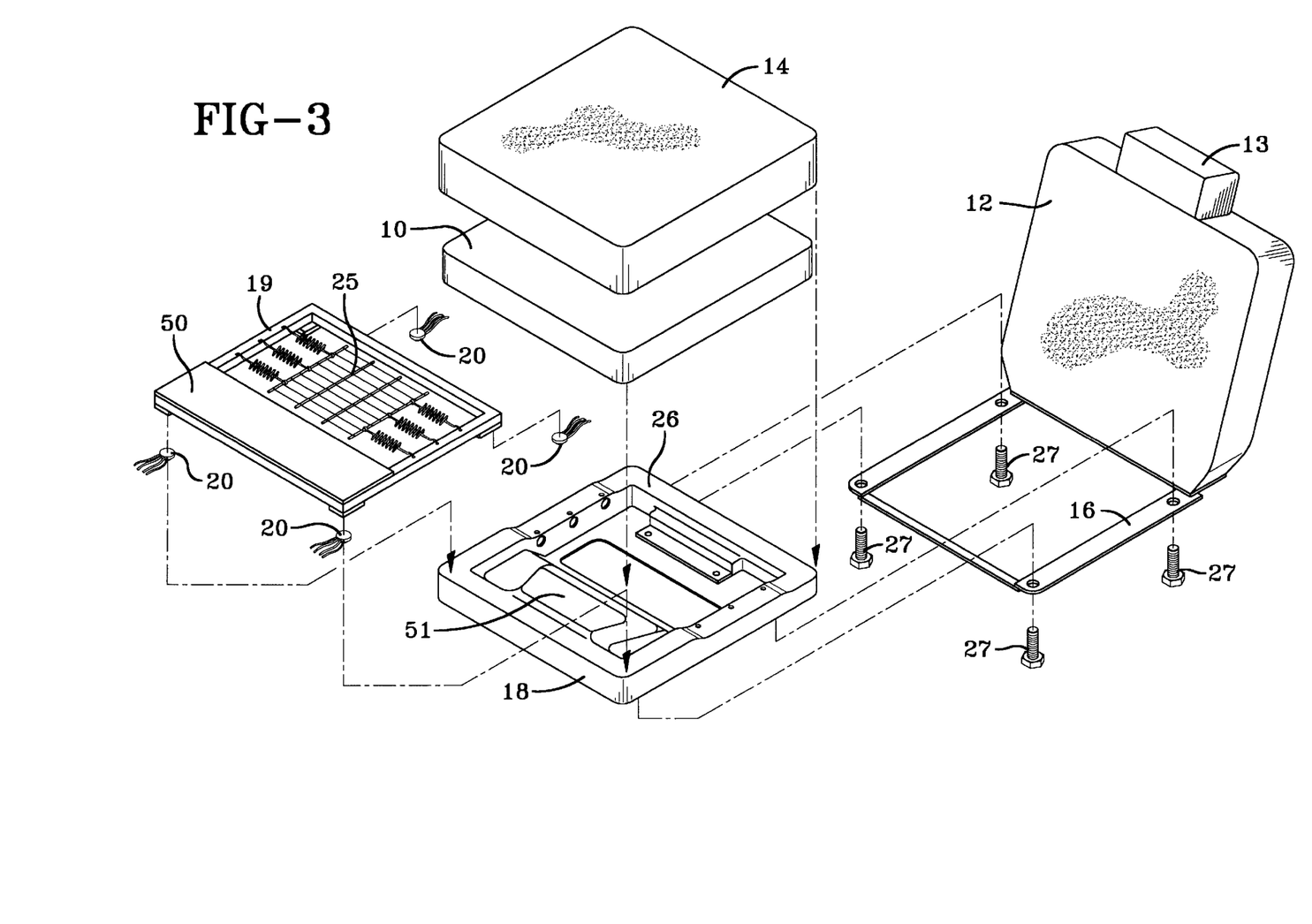
FIG. 3 is an exploded view of a vehicle seat equipped with a seat force sensing assembly of an airbag deployment controller in accordance with the present invention.

A seat pan 18 supports the seat cushion 10, which is adapted to be secured thereto by having bottom side 11 that is contoured, as shown in FIG. 2, to be complementary to the seat pan 18. The seat pan has a generally rectangular shape which may be adapted to the design of a particular seat cushion and seat frame. As shown in FIG. 1 the perimeter of the seat pan is bent to form peripheral walls which may, or may not, have a second horizontal portion associated therewith. A supportive cushioning elastic structure comprising 25 comprising springs and straps, or any other suitable support members, extends across the opening in the seat pan 18 to provide support for the seat cushion 10.

The seat frame 16 and the seat pan 18 are fastened to one another in a vertically juxtaposed relationship. In this example the means for fastening the rigid seat support member and the seat pan 18 to one another are a plurality of threaded fasteners 27. The threaded fasteners do not extend through the uppermost surface 26 of the seat pan, but rather are attached to the seat pan in depressions located in the upper surface of the seat pan or attach to a lower horizontally extending portion of the seat pan. The upholstery 14 is a sheet material which overlies the seat cushion 10 and is secured to the seat pan 18. Examples of sheet materials used as upholstery are fabrics, vinyls and leathers.

Referring next to FIGS. 3 to 6 there are shown exploded, front elevation, side elevation and top views, respectively, of a vehicle seat equipped with a seat force sensing assembly of an airbag deployment controller in accordance with the present invention. Of course it is understood that the design of various structural components of a vehicle seat can vary from one make and model of vehicle to another, with the vehicle seat shown being merely exemplary of a vehicle seat that may be employed in the practice of the present invention.

Figure 5:
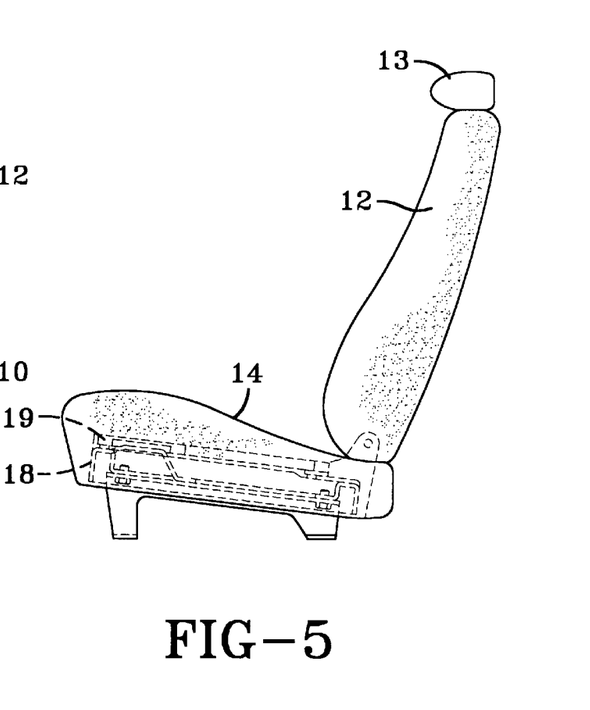
FIG. 5 is a side elevation view of a vehicle seat equipped with a seat force sensing assembly of an airbag deployment controller in accordance with the present invention.

As in the prior art the vehicle seat has a seat cushion 10 and a seat back 12. The seat back may have a head rest 13 associated therewith. The seat back may be pivotally attached to the remainder of the seat, as best seen in FIG. 5. As in the prior art the seat cushion 10 is made of a comfortable, supportive but compressible material, for example foam rubber. The seat frame 16 is substantially like the prior art seat frame described above with reference to FIG. 1.

The seat pan 18 which supports the seat cushion 10 is substantially like the seat pan described above with respect to FIG. 1 and is attached to the seat frame 16 using threaded fasteners 27 in substantially the same manner as described above. The upholstery 14, as in the prior art, is a sheet material overlying the seat cushion 10 and secured to the seat pan 18. An advantage of the airbag deployment controller of the present invention is that this controller may be retrofitted to a prior art vehicle seat.

Figure 7A:
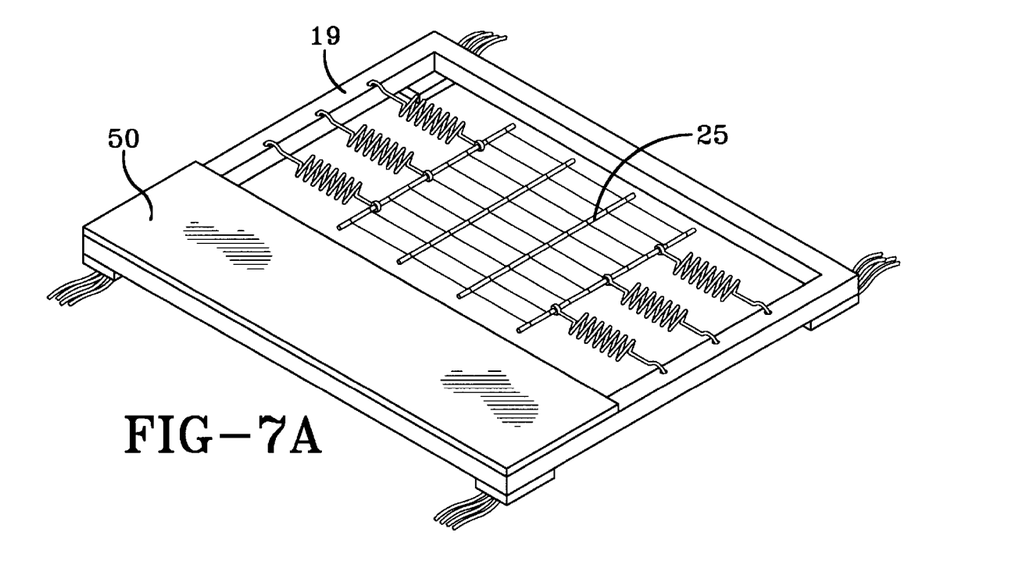
FIG. 7A is a perspective view of the top side of a seat force sensing assembly comprising a frame with sensors mounted thereon.
Figure 7B:
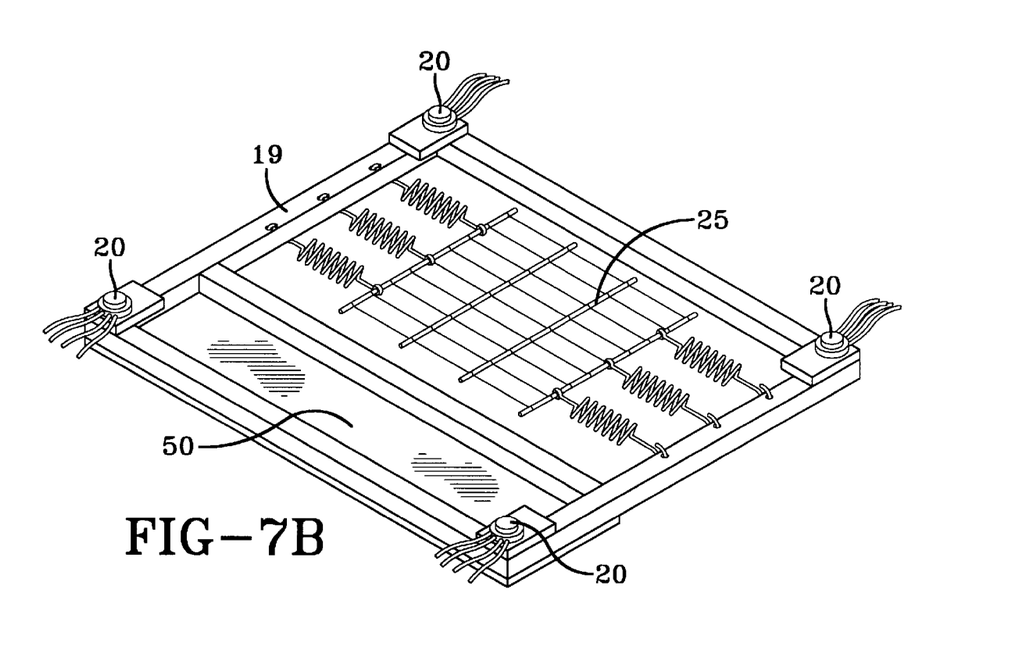
FIG. 7B is a perspective view of the bottom side of a seat force sensing assembly comprising a frame with sensors mounted thereon.

A seat force sensing assembly of an airbag deployment controller in accordance with the present invention has a seat pan 18 with a rigid member 19 disposed vertically above said seat pan in a spaced apart vertically juxtaposed relationship with the seat pan. Referring next to FIGS. 7A and 7B there are shown perspective views of the top side and bottom side, respectively, of a seat force sensing assembly comprising a frame 19 with sensors 20 mounted thereon. In the embodiment illustrated in FIGS. 7A and 7B the rigid member 19 is a frame which has a generally rectangular shape and a sensor 20 is located in the vicinity of each corner of the frame. A supportive cushioning elastic structure 25 comprising springs and straps, or any other suitable support members, which in the prior art extends across the opening in the seat pan 18 to provide support for the seat cushion 10 instead extends across the frame 19. This feature prevents the springs from contacting both the seat pan and the frame, therefore potentially transferring forces from the frame to the seat pan.

Figure 6:
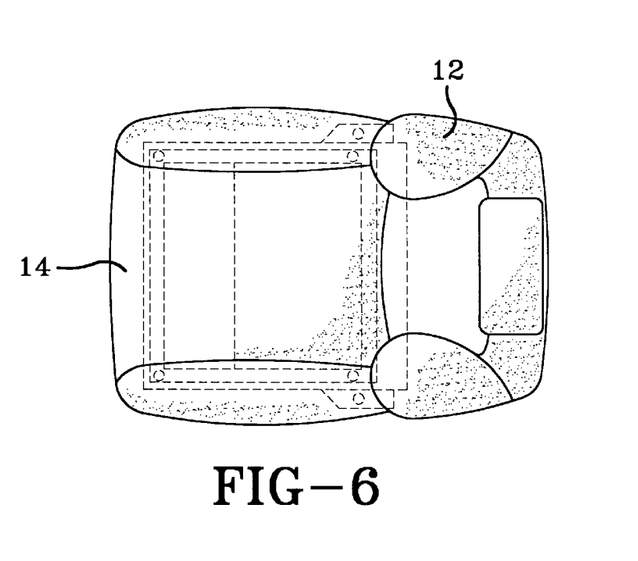
FIG. 6 is a top view of a vehicle seat equipped with a seat force sensing assembly of an airbag deployment controller in accordance with the present invention.
Figure 8:
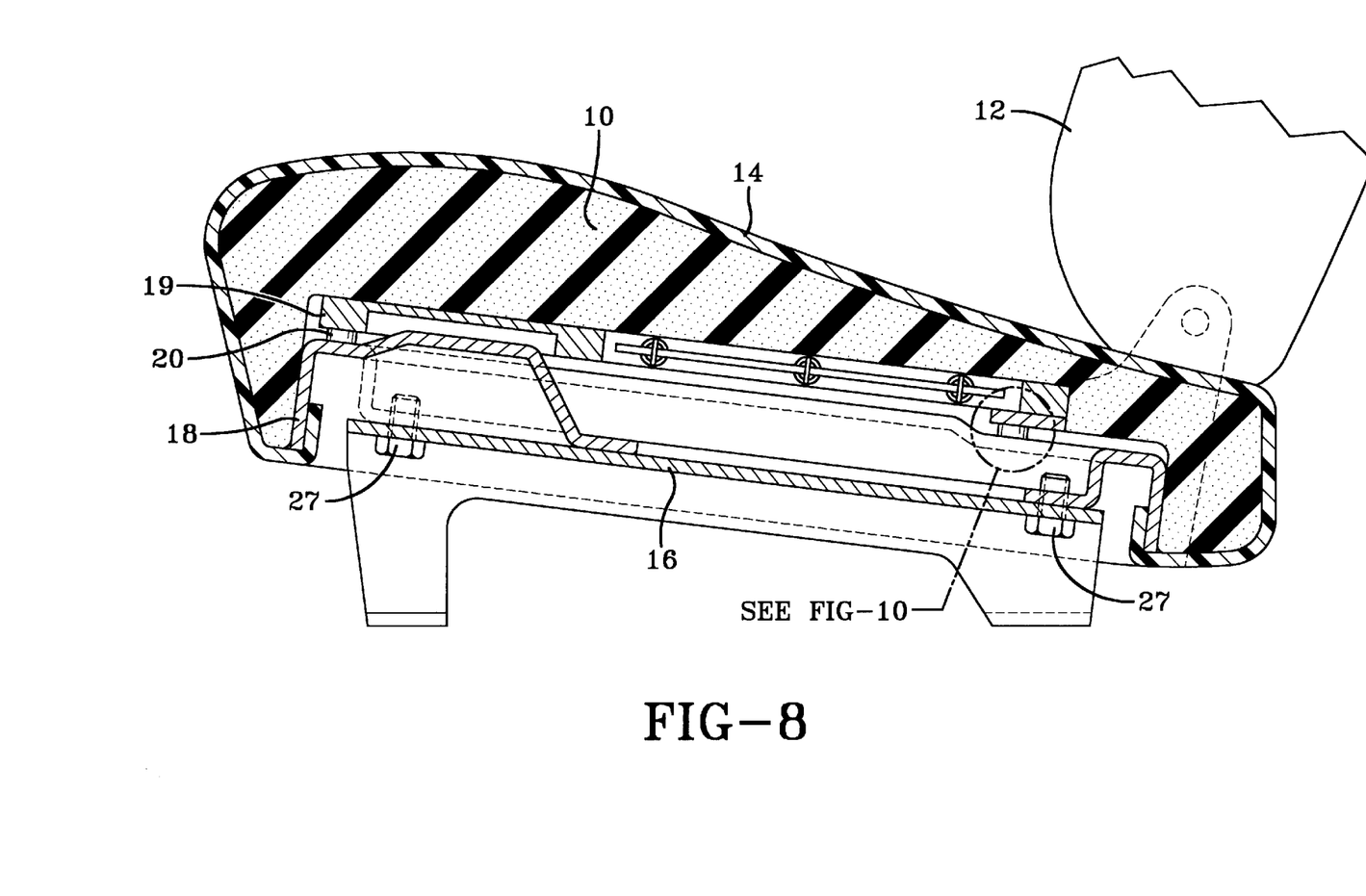
FIG. 8 is a cross-sectional side view, taken along line 8—8 of FIG. 4, of a vehicle seat equipped with a seat force sensing assembly of an airbag deployment controller in accordance with the present invention.

As shown in FIGS. 5, 6 and 8 the rigid member 19 underlies a portion of the seat cushion 10 and may be made of any suitable material such as steel or aluminum. In the embodiment shown the frame 19 includes a plate 50 which is located to be complementary to the anti-submarining portion 51 of the seat pan 18. The anti-submarining portion of a seat pan restricts the tendency of a belted seat occupant to slide forward during a rapid deceleration of the vehicle.

A plurality of sensors 20 , preferably at least four, are interposed between the rigid member 19, or frame, and the seat pan 18 such that all of the force transferred from the rigid member to the seat pan is transferred via the sensors. As used herein and in the claims "plurality" is understood to mean two or more. The sensors sense the magnitude of the force transferred therethrough and send signals to a device, shown in FIGS. 12B and 12C, which processes the signals to determine the weight that the portion of the seat cushion which the rigid member 19 underlies is bearing. Each sensor 20 may be for example a strain gauge, a load cell or a variable resistance pressure sensor. A working prototype of a vehicle seat equipped with a seat force sensing assembly of an airbag deployment controller in accordance with the present invention employed four sensors which were Model 14 compression only subminiature load cells purchased from Sensotec, Inc. of 1200 Chesapeke Avenue, Columbus, Ohio U.S.A. These sensors had a range of either 45.4 kilograms (100 pounds) or 113.5 kilograms (250 pounds) and a seat could be equipped with only one size sensor or a combination of sizes. For example, 113.5 kilogram sensors could be used towards the front of the seat and 45.4 kilogram sensors could be used towards the rear of the seat. The height of these sensors is 3.8 millimeters (0.15 inch). If desired, at least one of the sensors may be one type of sensors, while the other sensor(s) may be another type of sensor.

It is understood that the seat force sensing assembly may employ any suitable sensor such as, for example, a strain gauge, a load cell, or a variable resistance pressure sensor.

If the surface of the rigid member 19 which is proximal to a sensor 20 is not substantially flat, it is desirable with the commercially available sensors used in the working prototype to place a shim of some sort between the sensor and the rigid member to improve the transfer of forces from the rigid member to the sensor. The installation of the a seat force sensing assembly of an airbag deployment controller into the seat is preferably facilitated by securing the sensors in place on the rigid member (frame) and thereafter placing the resultant seat force sensing assembly in a vertically juxtaposed relationship with the seat pan, with the sensors resting on the vertically uppermost surface of the seat pan 18.

Figure 10:
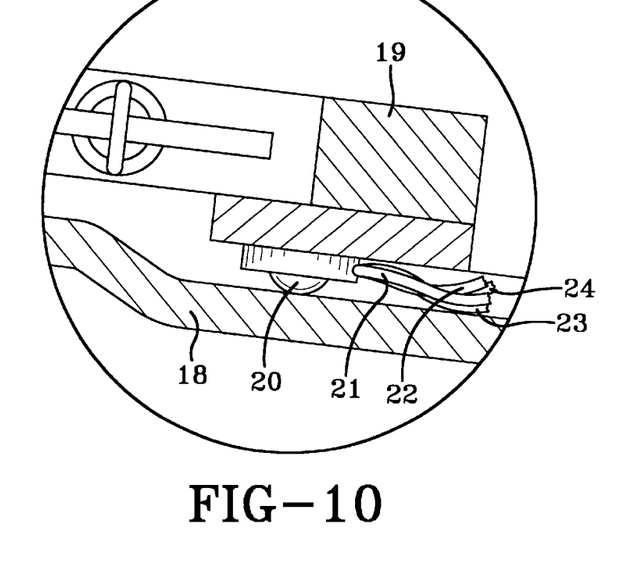
FIG. 10 is an enlarged fragmentary view of a sensor located between rigid components of a vehicle seat equipped with a seat force sensing assembly of an airbag deployment controller in accordance with the present invention.
Figure 12A:
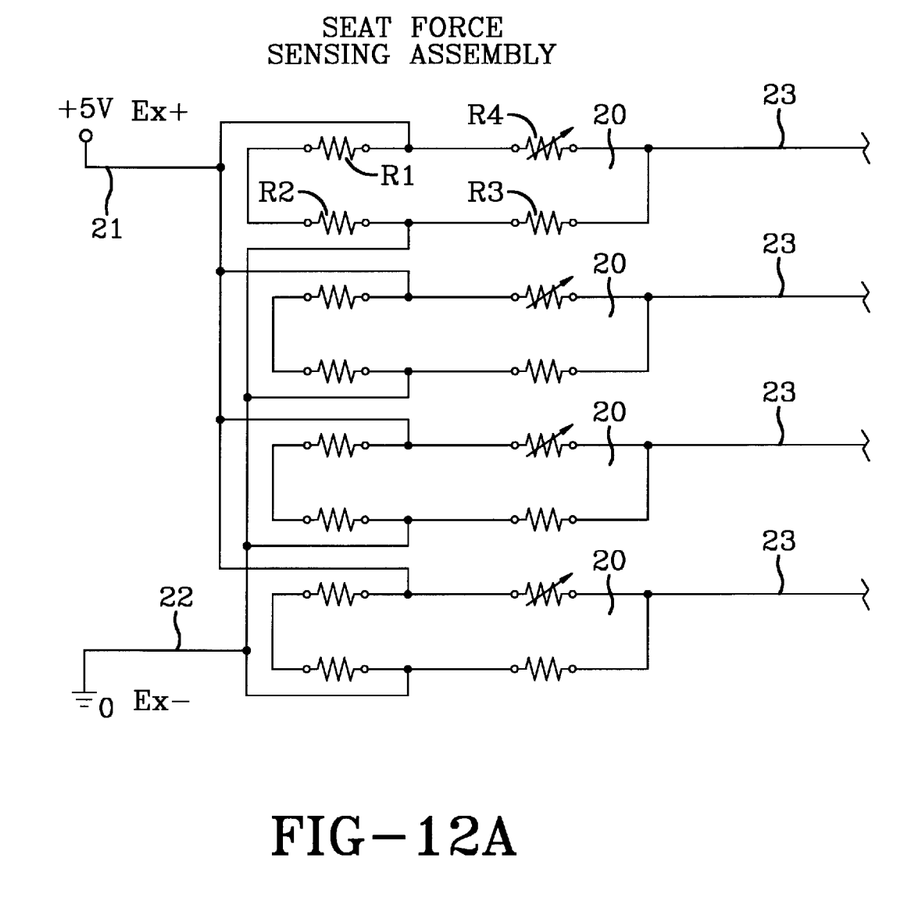
FIG. 12A is a schematic representation of an exemplary electrical circuit for a seat force sensing assembly of an airbag deployment controller in accordance with the present invention.
Figure 12B:
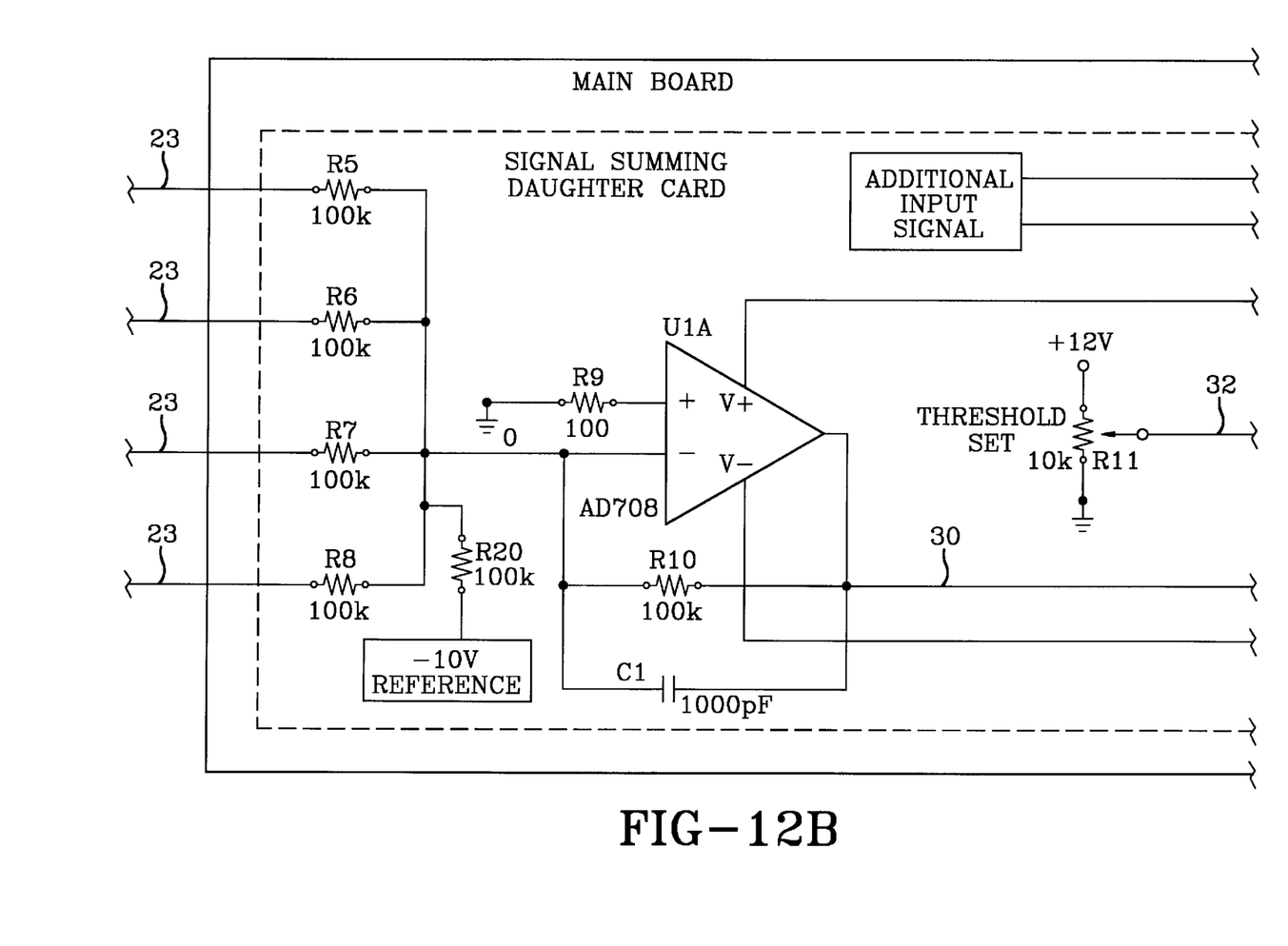
FIG. 12B is a schematic representation of an exemplary electrical circuit for a weight sensor processor of an airbag deployment controller in accordance with the present invention.

As shown in FIG. 10, which is an enlarged fragmentary view, at the location indicated in FIG. 8, of a sensor 20 located between the rigid member 19 and the seat pan 18, each sensor has a plurality of electrical leads 21, 22, 23 and 24 extending therefrom for communicating with a shown in FIG. 12B which processes said signals to determine the weight that the portion of the seat cushion which the rigid member underlies is bearing. The vertically spaced apart relationship of the rigid member 19 (frame) and the seat pan 18 is illustrated very well in FIG. 10. The distance that the rigid member (frame) is spaced apart from the seat pan 18 is the height of the sensor disposed therebetween.

Figure 4:
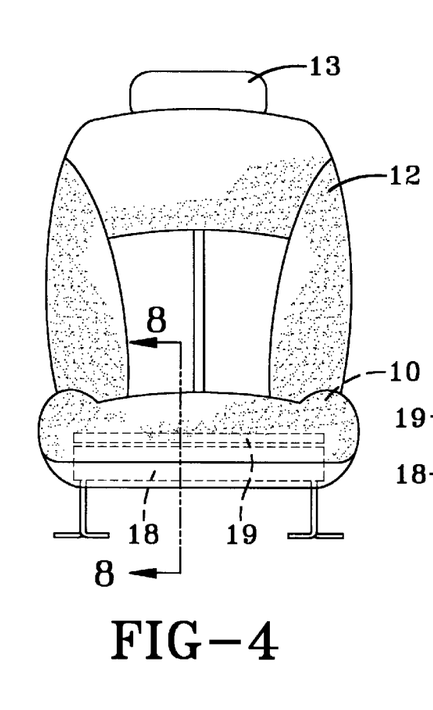
FIG. 4 is a front elevation view of a vehicle seat equipped with a seat force sensing assembly of an airbag deployment controller in accordance with the present invention.

As shown in FIG. 8, which is a cross-sectional side view, taken along line 8—8 of FIG. 4, the portion of the seat cushion 10 which the rigid member 19 underlies is preferably spaced apart from a rear edge of the seat cushion. This feature minimizes the sensing of forces which are transferred from the seat back to the seat pan 18 via the sensors. This is important in the instance where a person seated in the rear seat of an automobile leans against the back of the front seat and could influence the forces transferred to the seat pan. It has been demonstrated that the seat occupant sensing system of the present invention is capable of determining the presence and weight of a seat occupant with good accuracy.

The rigid member 19 and the seat pan 18 are at least partially retained in said vertically juxtaposed relationship by a tension member. In the embodiment shown in the drawings the tension member is a sheet material 14 overlying the seat cushion 10 and secured to the seat pan 18. The sheet material is commonly referred to as the seat cover or upholstery. As shown in FIG. 8 the perimeter of the sheet material may have clips or a deformable strip associated therewith which can clip onto or be bent around an edge of the seat pan.

Figure 9:
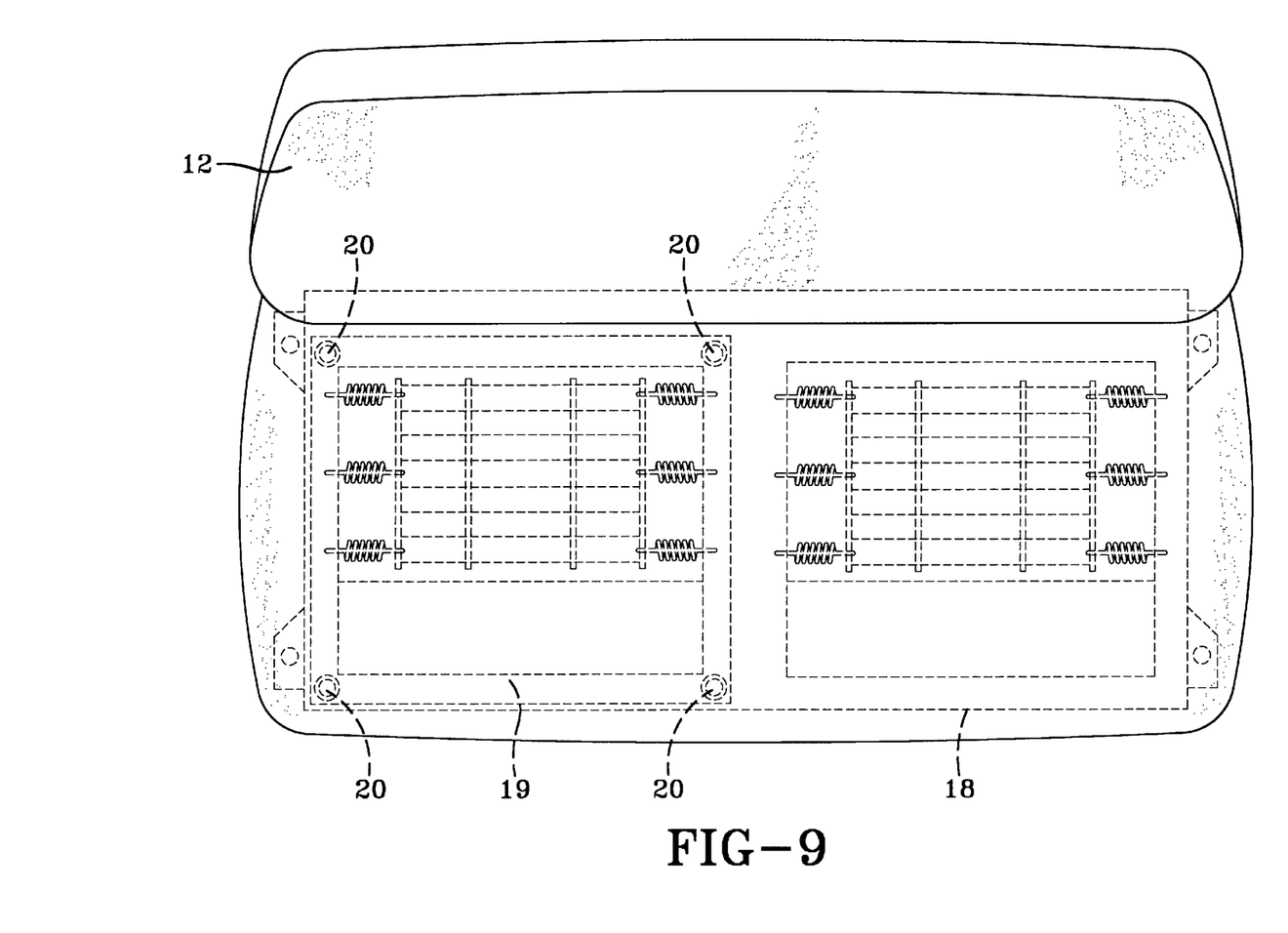
FIG. 9 is a top view of a vehicle bench type vehicle seat equipped with a seat force sensing assembly of an airbag deployment controller in accordance with the present invention.

Referring next to FIG. 9 there is shown a top view of a vehicle bench type seat equipped with a seat force sensing assembly employing a rigid member 19 and sensors 20 in accordance with the present invention. If it is desired to determine the presence and size of an occupant of the passenger side of a front bench seat of a vehicle, a seat force sensing assembly of an airbag deployment controller of the present invention may be incorporated into only the passenger side of the bench seat as illustrated in FIG. 9.

Figure 11:
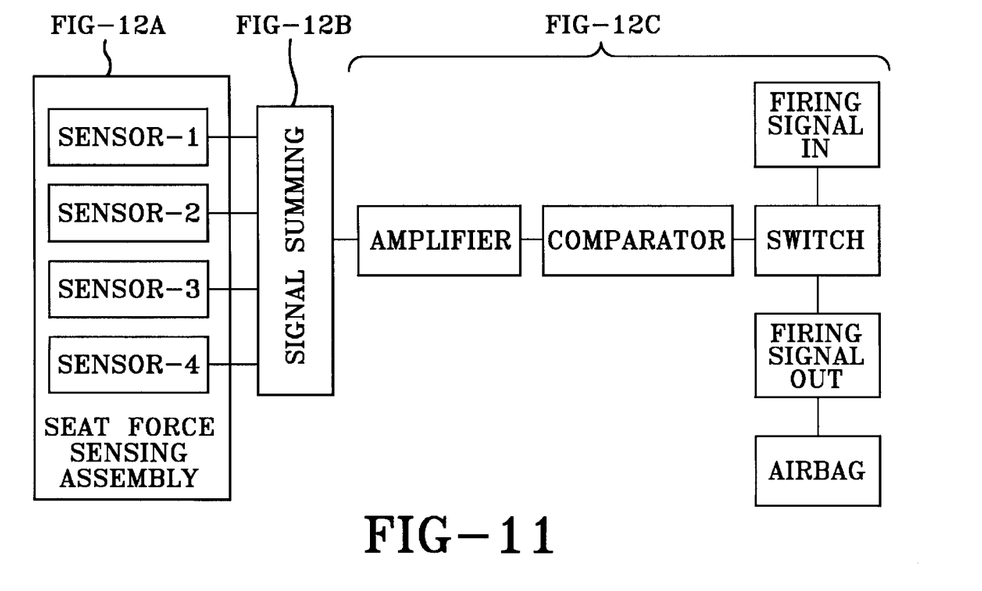
FIG. 11 is a schematic representation of an airbag deployment controller in accordance with the present invention.

Referring next to FIG. 11 there is shown a schematic overview of an airbag deployment controller in accordance with the present invention. The four force sensors of the seat force sensing assembly each send a signal to the signal summing circuit which adds together the signal voltages from the sensors to generate a normalized output which is a summation signal. That is to say, each of the sensors is in circuit communication with signal summing circuitry. As used herein and in the claims the term "in circuit communication" is used to describe (i) devices that are directly or indirectly electrically connected with each other, (ii) devices having other devices or combinations of devices (e.g. breakers, relays, buffers, drivers, transmitters, receivers, and decoders) between them, (iii) devices in optoisolator or fiber optic link, (iv) devices in electromagnetic communication with each other (via, e.g. radio frequency transmitter and receiver pair), (v) devices connected by and through other structures allowing them to communicate with each other, and (vi) any combination of the above.

In the exemplary device shown in FIGS. 11, 12A, 12B and 12C, the summing is done by signal summing circuitry associated with a daughter card. As used herein and in the claims a "daughter card" is understood to be a plug in module containing electronic circuitry for one or more specific functions. While the use of a daughter card in the practice of the present invention is optional, the advantages of employing a daughter card will be elaborated upon below.

The summation signal is amplified and the amplified summation signal is transmitted to a comparator which compares the amplified summation signal to a threshold voltage which corresponds to a preselected force transmitted through the seat cushion to the seat force sensing assembly. This preselected force corresponds to a seat occupant weight that is a threshold below which it is presumed that either the seat is not occupied or the seat is occupied by a child below the threshold weight.

If the force transmitted through the seat cushion to the seat force sensing assembly is interpreted to be above the threshold value, the airbag is allowed to deploy and if the force transmitted through the seat cushion to the seat force sensing assembly is interpreted to be below the threshold value the airbag is not allowed to deploy. An exemplary embodiment of an electrical circuit for performing these functions is shown in FIGS. 12A, 12B and 12C.

Referring next to FIG. 12A there is shown an electronic schematic of an exemplary embodiment of a seat force sensing assembly employing four sensors 20 which are Model 14 compression only subminiature load cells purchased from Sensotec, Inc. of 1200 Chesapeke Avenue, Columbus, Ohio U.S.A. as described above with regards to FIGS. 5, 6 and 8. Each of these sensors is a Wheatstone bridge. Simply put, a positive excitation Ex+ is transmitted from a regulated DC power source to each sensor via a conductor 21, and each sensor is referenced to a common ground via another conductor 22. Each Wheatstone bridge has three resistors R1, R2 and R3 of known value and a fourth resistor R4 having a resistance that varies in response to the force transmitted through the sensor. While in this exemplary embodiment the sensors employed were variable resistance pressure sensors, it is understood that other types of sensors including, for example, strain gauges, load cells, variable resistance pressure sensors, variable capacitance pressure sensors, variable inductance pressure sensors (for example a magnetostrictive sensor) or any other suitable sensing means may be used in place thereof.

As shown in FIGS. 12A and 12B, each sensor produces a positive signal output which is transmitted through a conductor 23 to an operational amplifier (sometimes referred to as an "op amp") configured as a summation circuit which produces a summation signal. The summation circuit comprises resistors R5 through R7, resistor R20, capacitor C1 and integrated circuit U1A. It is understood that while in this exemplary embodiment an operational amplifier was used to sum the positive signal from the sensors, it is understood that any suitable summing circuitry, including even merely joining the conductors 23 together may be employed. Throughout the device the offset and reference voltages are derived via positive and negative voltage regulators, voltage references, and voltage inverters in the usual manner. In this working prototype the fourth electrical lead (identified as 24 in FIG. 10) of each sensor is merely tied off to the fourth electrical lead of each of the other sensors.

Figure 12C:
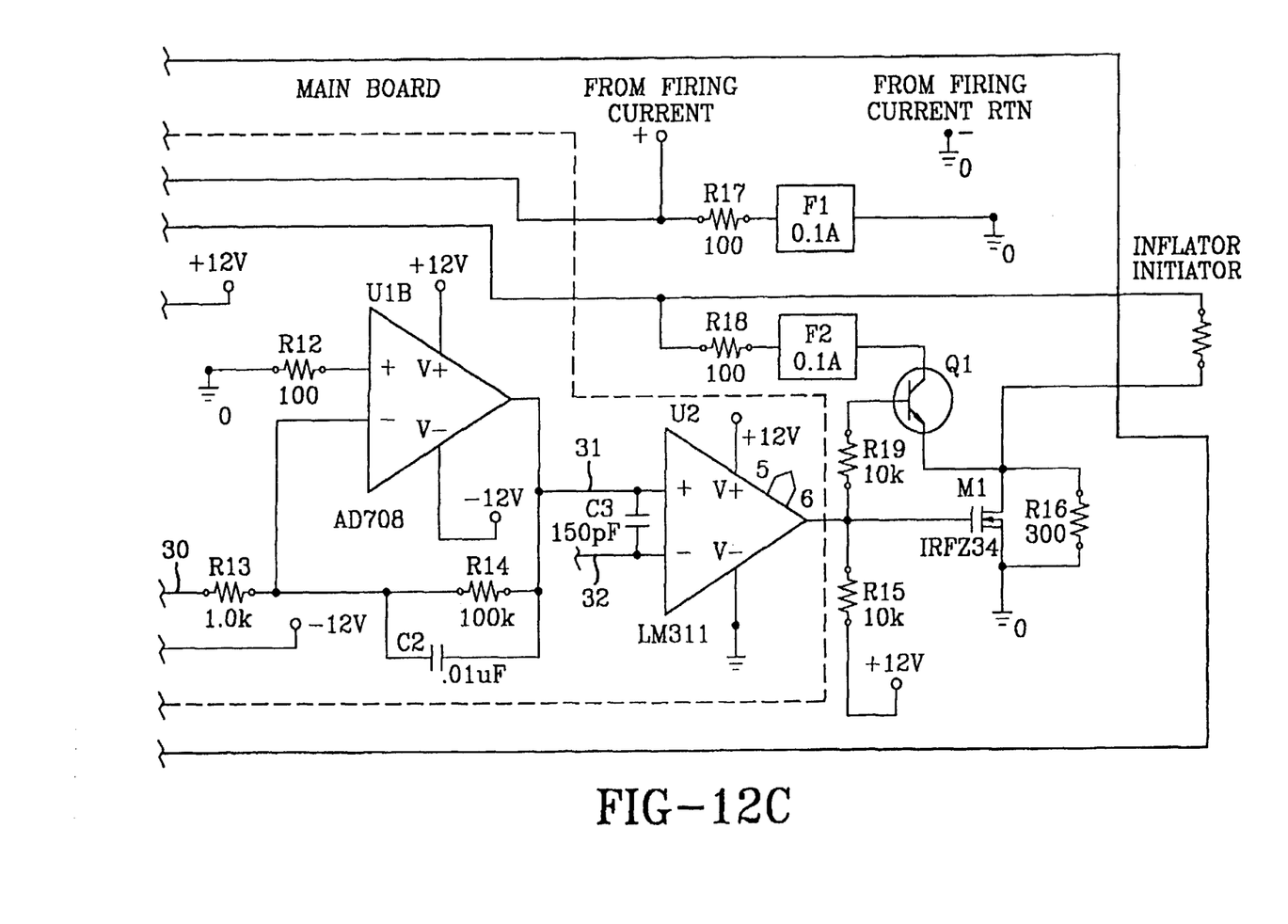
FIG. 12C is a schematic representation of an exemplary electrical circuit for a seat occupant weight sensing airbag switch of an airbag deployment controller in accordance with the present invention.

Referring next to FIG. 12C, the summation signal is transmitted via a conductor 30 to a signal amplifier (sometimes referred to as a gain circuit) comprising resistors R12, R13, and R14, capacitor C2 and integrated circuit U1B. That is to say the signal amplifier circuitry amplifies the output of the summing circuitry before the output of the summing circuitry is processed by the comparator circuitry. The summing circuitry, amplifier circuitry and comparator circuitry are each in circuit communication with another component of the signal processor. While U1A and U1B are a single integrated circuit unit, it is understood that alternatively the functions of these may be conducted by two separate integrated circuits. It is understood that if the comparator employed is able to process the summation signal in an "as produced" state, this signal amplifier may be omitted. The resultant amplified summation signal is transmitted via a conductor 31 to comparator circuitry such as a comparator operational amplifier (sometimes referred to as a comparator op amp). The comparator op amp comprises an integrated circuit designated U2 and a resistor R15. The threshold voltage, which as explained above corresponds to a preselected weight supported by the portion of the seat cushion which transmits force to the seat force sensing assembly, is set using a threshold set potentiometer R11 which in this example is located on the daughter card as shown in FIG. 12B. The threshold voltage is transmitted to the comparator via a conductor 32. The comparator compares the amplified summation signal to the threshold voltage. If the amplified summation signal is less than the threshold voltage, the output of the comparator is zero volts. If the amplified summation signal is equal to or greater than the threshold voltage, the output of the comparator is a preselected voltage, in this particular embodiment twelve volts. The output of the comparator is transmitted via a conductor to an airbag on/off switch M1, which in this embodiment is a switching transistor. This switch is one through which an airbag firing signal must pass, so if the switch is open the airbag will not be deployed, while if the switch is closed the airbag may be deployed. A trickle current of a sufficient amplitude to allow a self diagnosis of the airbag operation circuit, but not sufficient to allow deployment of the airbag, passes through a resistor R16 to facilitate the self diagnosis whether or not the weight supported by the portion of the seat cushion which transmits force to the seat force sensing assembly exceeds the preselected threshold.

Optionally, an additional input signal indicating the amount of tension on a seat belt associated with the seat may processed by the airbag deployment controller to compensate for excessive force transferred through the seat cushion to the force sensing assembly. There is a limit on the amount of tension on a lap belt, or the lap portion of a three point belt, which can be comfortably tolerated by the flesh of a human seat occupant. However, an infant or child seat can tolerate a higher amount of tension from a lap belt, or the lap portion of a three point belt, employed to secure the infant seat or child seat to a vehicle seat and this excessive seat belt tension on the infant or child seat may result in excessive force being transmitted through the seat cushion to the seat force sensing assembly. The tension on the seat belt may be sensed for example by a strain gauge, magnetostrictive sensor, or any other suitable means of sensing tension on a belt or stress placed on a seat belt anchor by tension on a belt. One alternative for processing the signal output of a seat belt tension sensing device(s) is to transmit to suitable signal processing circuitry which if the seat belt tension exceeds a predetermined level indicates that the seat belt is secured against other than flesh, and the overall weight sensed exceeds the preselected level, in which case no current will be sent to the inflator initiator. Another alternative for employing the signal output of a seat belt tension sensing device(s) is to process this signal output in conjunction with the output of the sensors of the seat force sensing assembly to compensate for the portion of the force transmitted through the seat cushion which is attributable to the excessive tension on the seat belt.

A first event recorder comprising a resistor R17 and a fuse F1 will indicate if a firing pulse has entered into the circuitry of the airbag deployment control device. This is a permanent record of the generation of a firing pulse during a crash which would normally require deployment of the airbag, even if the airbag was not deployed due to the below threshold occupant weight. A second event recorder comprising a resistor R18 and a fuse F2 will indicate if a firing pulse has passed through the circuitry of the airbag deployment control device to the initiator. This is a permanent record that during a crash a firing pulse was transmitted to the initiator.

In the event that a crash of sufficient severity occurs, and the weight sensor does not sense that the seat is either unoccupied or occupied by a child, a firing pulse is transmitted via a conductor to an inflator initiator, in this embodiment a squib, which initiates the generation of inflation gas or the release of stored gas into an airbag. The inflator initiator may be any suitable electrical or electro-mechanical device, such as a squib.

The advantages of placing part of the circuitry on a daughter board, as described briefly above, are best appreciated by having the circuitry on the daughter board calibrated to the physical and electrical characteristics of an individual vehicle seat during the seat production process, and allowing the daughter board to remain with that seat through the installation of the seat in a vehicle. The seat force sensing assembly and the associated daughter board may be installed in a vehicle seat outside of a production or laboratory environment, which facilitates repairs and retrofitting of vehicles with the airbag deployment controller of the present invention. The circuitry on the daughter board can be placed in circuit communication with the remainder of the airbag deployment controller after the seat is installed in a vehicle, or after the seat force sensing assembly and the associated daughter board have been installed in a seat that is already located in a vehicle.

The location of the components of the airbag deployment controller in the vehicle may be selected to be any location that is selected in accordance with good engineering practices and the configuration of a particular vehicle, so long as the components are in circuit communication seat force sensing assembly. For example, the signal summing circuitry, the signal amplifier circuitry, and the comparator circuitry may be mounted under the seat, such as attached to the seat frame. The remaining circuitry including the switch through which an airbag firing signal must pass and the firing signal recording circuitry may be located nearer to the airbag inflator, such as in the instrument panel. Alternatively, all of the circuitry except the seat force sensing assembly may be located in close proximity to the airbag inflator.

While certain representative embodiments and details have been presented for the purpose of illustrating the invention, it will be apparent to those skilled in the art that various changes and modifications may be made therein without departing from the spirit and scope of the invention.

We claim:

1. An airbag deployment controller comprising:
   (a) a seat force sensing assembly comprising:
      (i) a seat pan,
      (ii) a rigid member disposed vertically above said seat pan in a spaced apart vertically juxtaposed relationship with said seat pan, said rigid member underlying a portion of a seat cushion, and
      (iii) a plurality of sensors interposed between the rigid member and the seat pan such that all of the force transferred from the rigid member to the seat pan is transferred via said sensors which sense the magnitude of the force transferred therethrough and generate signals; and
   (b) a signal processor which is in circuit communication with said sensors and comprises
      (i) signal summing circuitry;
      (ii) comparator circuitry; and
      (iii) a switch through which an airbag firing signal must pass, with each component of the signal processor being in circuit communication with another component of the signal processor.

2. An airbag deployment controller according to claim 1 wherein the rigid member of the seat force sensing assembly has a generally rectangular shape and a sensor is located in the vicinity of each corner of the rigid member.

3. An airbag deployment controller according to claim 1 wherein the signal processor further comprises signal amplifier circuitry which amplifies the output of the summing circuitry before the output of the summing circuitry is processed by the comparator circuitry.

4. An airbag deployment controller according to any of claims 1, 2 or 3 wherein at least one of said sensors is a strain gauge.

5. An airbag deployment controller according to any of claims 1, 2 or 3 wherein said at least one of said sensors is a load cell.

6. An airbag deployment controller according to any of claims 1, 2 or 3 wherein at least one of said sensors is a variable resistance pressure sensor.

7. An airbag deployment controller according to any of claims 1, 2 or 3 wherein at least one of said sensors is a variable capacitance pressure sensor.

8. An airbag deployment controller according to any of claims 1, 2 or 3 wherein at least one of said sensors is a variable inductance pressure sensor.

9. An airbag deployment controller according to claim 1 wherein the rigid member and the seat pan are at least partially retained in said vertically juxtaposed relationship by a tension member.

10. An airbag deployment controller according to claim 1 wherein said tension member is a sheet material overlying the seat cushion and secured to the seat pan.

11. An airbag deployment controller according to claim 1 further comprising means for sensing the tension on a seat belt and circuitry for processing a signal from said tension sensing means.

12. An airbag deployment controller comprising:
   a. a seat force sensing assembly comprising
      (i) a seat having a seat support member and a seat pan member fastened to one another;
      (ii) a frame disposed vertically above said seat pan in a spaced apart vertically juxtaposed relationship with said seat pan, said frame underlying a portion of a seat cushion; and
      (iii) a plurality of sensors interposed between the frame and the seat pan such that all of the force transferred from the frame to the seat pan is transferred via said sensors which sense the magnitude of the force transferred therethrough and send signals to a signal processor; and
   b. a signal processor which is in circuit communication with said sensors and processes the signals from the sensors to determine the weight that said portion of the seat cushion is bearing, said signal processor comprising
      (i) signal summing circuitry;
      (ii) comparator circuitry; and
      (iii) a switch through which an airbag firing signal must pass with each component of the signal processor being in circuit communication with another component of the signal processor.

13. An airbag deployment controller comprising:
   a. a seat force sensing assembly comprising
      (i) a seat having a seat support member and a seat pan member fastened to one another;
      (ii) a frame disposed vertically above said seat pan in a spaced apart vertically juxtaposed relationship with said seat pan, said frame underlying a portion of a seat cushion, said portion of the seat cushion being spaced apart from a rear edge of the seat cushion; and
      (iii) a plurality of sensors interposed between the frame and the seat pan such that all of the force transferred from the frame to the seat pan is transferred via said sensors which sense the magnitude of the force transferred therethrough and send signals to a device which processes said signals to a signal processor; and
   b. a signal processor which is in circuit communication with said sensors and processes the signals from the sensors to determine the weight that said portion of the seat cushion is bearing, said signal processor comprising
      (i) signal summing circuitry;
      (ii) comparator circuitry; and
      (iii) a switch through which an airbag firing signal must pass with each component of the signal processor being in circuit communication with another component of the signal processor.

14. An airbag deployment controller according to claim 13 wherein the frame has a generally rectangular shape and a sensor is located in the vicinity of each corner of the frame.

15. An airbag deployment controller comprising:
   a. a seat force sensing assembly comprising
      (i) a seat having a seat support member and a seat pan member fastened to one another;
      (ii) a frame disposed vertically above said seat pan in a spaced apart vertically juxtaposed relationship with said seat pan, said frame underlying a portion of a seat cushion, the frame and the seat pan being at least partially retained in said vertically juxtaposed relationship by a tension member;
      (iii) a plurality of sensors interposed between the frame and the seat pan such that all of the force transferred from the frame to the seat pan is transferred via said sensors which sense the magnitude of the force transferred therethrough and send signals to a signal processor; and
   a. a signal processor which is in circuit communication with said sensors and processes the signals from the sensors to determine the weight that said portion of the seat cushion is bearing, said signal processor comprising
(i) signal summing circuitry;
(ii) comparator circuitry; and
(iii) a switch through which an airbag firing signal must pass with each component of the signal processor being in circuit communication with another component of the signal processor.

16. An airbag deployment controller according to claim 15 wherein said tension member is a sheet material overlying the seat cushion and secured to the seat pan.

17. An airbag deployment controller according to either of claims 15 or 16 wherein at least one of said sensors is a strain gauge.

18. An airbag deployment controller according to either of claims 15 or 16 wherein at least one of said sensors is a load cell.

19. An airbag deployment controller according to either of claims 15 or 16 wherein at least one of said sensors is a variable resistance pressure sensor.

20. An airbag deployment controller according to either of claims 15 or 16 wherein at least one of said sensors is a variable capacitance pressure sensor.

21. An airbag deployment controller according to either of claims 15 or 16 wherein at least one of said sensors is a variable inductance pressure sensor.

22. A kit for retrofitting a vehicle seat with an airbag deployment controller comprising a frame having a plurality of sensors mounted thereon in locations which correspond to a vertically uppermost surface of a vehicle seat pan and a signal processor which processes signals from said sensors to determine the weight that is located above and resting upon said frame, said signal processor comprising
   a. signal summing circuitry;
   b. comparator circuitry; and
   c. a switch through which an airbag firing signal must pass with each component of the signal processor being in circuit communication with another component of the signal processor.

* * * * *